(12) United States Patent
Fitzner et al.

(10) Patent No.: US 7,555,283 B2
(45) Date of Patent: Jun. 30, 2009

(54) COMMUNICATION SYSTEM AND METHOD FOR MOBILE AND STATIONARY DEVICES

(75) Inventors: Werner Fitzner, Sassenberg (DE); Heinz-Hermann Wippersteg, Buende (DE); Thilo Steckel, Harsewinkel (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 512 days.

(21) Appl. No.: 11/178,751

(22) Filed: Jul. 11, 2005

(65) Prior Publication Data

US 2006/0014489 A1   Jan. 19, 2006

(30) Foreign Application Priority Data

Jul. 19, 2004   (DE) ............... 10 2004 034 799

(51) Int. Cl.
*H04M 11/04* (2006.01)
(52) U.S. Cl. ........... 455/404.2; 455/404.1; 455/11.1; 340/902; 701/205
(58) Field of Classification Search ............ 455/404.2, 455/404.1, 11.1; 340/902; 701/205
See application file for complete search history.

(56) References Cited

U.S. PATENT DOCUMENTS

| | | | |
|---|---|---|---|
| 2003/0016146 A1* | 1/2003 | Bates et al. | 340/988 |
| 2003/0182259 A1* | 9/2003 | Pickett et al. | 707/1 |
| 2004/0246144 A1* | 12/2004 | Siegel et al. | 340/902 |
| 2006/0178814 A1* | 8/2006 | Everett | 701/205 |
| 2006/0282214 A1* | 12/2006 | Wolterman | 701/208 |
| 2007/0142026 A1* | 6/2007 | Kuz et al. | 455/404.1 |

FOREIGN PATENT DOCUMENTS

| | | |
|---|---|---|
| DE | 43 22 293 A1 | 1/1995 |
| DE | 198 43 664 A1 | 4/1999 |
| DE | 101 59 747 | 5/2003 |
| EP | 1 027 773 B1 | 4/2004 |
| WO | 96/15600 | 5/1996 |

* cited by examiner

*Primary Examiner*—Danh C Le
(74) *Attorney, Agent, or Firm*—Michael J. Striker (57) ABSTRACT

A communication system for mobile and stationary devices has at least one transmitter/receiver unit provided for the mobile and stationary devices and covering a defined transmission/reception range, and is formed so that at least partial overlap of the transmission/reception ranges of the mobile and/or stationary devices results in accidental communication between the mobile and/or stationary devices, and this accidental communication changes to a targeted communication.

30 Claims, 5 Drawing Sheets

COMMUNICATION SYSTEM AND METHOD FOR MOBILE AND STATIONARY DEVICES

BACKGROUND OF THE INVENTION

The present invention relates to a communication system and method for mobile and/or stationary devices.

Publication DE 43 22 293, among others, makes known a method for the electronic management of agricultural working machines, with which a central arithmetic unit coordinates working processes between working machines. The particular goal of the disclosed method is to provide the farmer with a tool with which he can efficiently coordinate his fleet of working machines and apply auxiliary substances in a specific manner depending on the yields determined. This reduces the costs for the auxiliary substances to be applied, since only that amount of fertilizer need now be applied to the ground, for example, that was previously removed from the ground by the amount of harvested crops recorded. To ensure that this application of fertilizer can be carried out in a geographically highly precise manner, the yield data are recorded using satellite navigation and stored in a data base, which is then called up to apply the fertilizer. Depending on the configuration, it is possible to store this geo-referenced data in an arithmetic unit of the particular working machine before use or to transfer it on-line to the arithmetic unit of the agricultural working machine during use.

In an embodiment of the method, the agricultural working machine, which is configured as a combine harvester, can also transmit information directly to sowing and fertilizing machines without relying on a master computer, the sowing and fertilizing machines simultaneously working the area already harvested by the combine harvester. Due to the one-sided orientation of management systems of this nature to the application of auxiliary substances on an as needed basis as a function of the determined yield of harvested crops, these systems are not suited to realizing data transfer between any type of agricultural working machines and/or stationary devices in the sense of optimizing a process chain, or for efficiently incorporating agricultural working machines into existing process chains.

SUMMARY OF THE INVENTION

The task of the present invention, therefore, is to propose a communication system for mobile and stationary devices that avoids the disadvantages of the related art described above and that, in particular, ensures results-oriented communication between the mobile and stationary devices.

In keeping with these objects and with others which will become apparent hereinafter, one feature of the present invention resides, briefly stated, in a communication system for mobile and stationary devices, comprising at least one transmitter/receiver unit provided for the mobile and stationary devices and having a defined transmission/reception range, and also formed so that at least partial overlap of the transmission/reception ranges of the mobile and/or stationary devices results in accidental communication between the mobile and/or stationary devices, and this accidental communication changes to a targeted communication.

Another feature of the present invention resides, briefly stated, in a communication system for mobile and stationary devices, comprising a transmitter/receiver unit provided for the mobile and/or stationary devices and covering a defined transmission/reception range, so that at least partial overlap of the transmission/reception range of the mobile and/or stationary devices induces accidental communication between the mobile and/or stationary devices and, whereby, this accidental communication then changes to a targeted communication when event-dependent and/or location-dependent relationships exist between the mobile and/or stationary devices.

A further feature of the present invention resides in a method for mobile and stationary devices, comprising the steps of providing at least one transmitter/receiver unit provided for the mobile and stationary devices and having a defined transmission/reception range; at least partially overlapping the transmission/reception ranges of the mobile and/or stationary devices, resulting in accidental communication between the mobile and/or stationary devices; and thereby changing this accidental communication to a targeted communication.

Still another feature of the present invention resides in a method for mobile and stationary devices, comprising the steps of providing a transmitter/receiver unit provided for the mobile and/or stationary devices and having a defined transmission/reception range; at least partially overlapping the transmission/reception range of the mobile and/or stationary devices including accidental communication between the mobile and/or stationary devices; and thereby changing this accidental communication then to a targeted communication when event-dependent and/or location-dependent relationships exist between the mobile and/or stationary devices.

Due to the fact that the at least partial overlap of the transmission/reception ranges of the mobile and/or stationary devices of the communication system according to the present invention results in accidental communication between them and, due to the fact that this accidental communication changes to targeted communication, it is ensured that any mobile and/or stationary devices can communicate with each other in an event-oriented manner.

In the simplest case, this targeted communication involves the offering of relevant information by first mobile and/or stationary devices, to which further mobile and/or stationary devices then react in a targeted manner. This creates an open data communication system in which information that is provided can be called up at random without the need for an operator to integrate the communicating mobile and stationary devices in the communication system for this purpose using special measures.

In an advantageous further development of the present invention, the reaction to the information provided can include the immediate use of the information received and its further processing—in a manner appropriate for the situation—in the particular mobile or stationary device. This makes it possible to adapt data—that has been provided for a general application—to special applications.

To make the communication system available for a group of users of any size, communication can be carried out—in an advantageous further development of the present invention—within the communication system using various data exchange systems.

To ensure that the targeted communication takes place only between mobile and/or stationary devices of this nature that are dependent on each other in a certain manner, the communication system can be designed such that, during accidental communication, an application context shared by the communicating mobile and stationary devices is queried and, if one does not exist, the communication is terminated. The particular advantage of this is that data is not exchanged unnecessarily.

In addition, the communication system can be configured such that, out of the large amount of transmittable data, only that data required for the certain application is made available. The data exchange is limited to the necessary data in this case as well.

A particularly efficient communication system is created when the exchanged, application-dependent information triggers the execution of processes directly without the need for the operator of the mobile or stationary devices to become involved. The work to be performed by the operator of the mobile and stationary devices is made substantially easier when the processes include the generation and execution of driving instructions, the generation of warning messages, instructions for completing an order, updating order information, and automatic recording of process data.

In order to ensure not only stable communication but also only that selected mobile and stationary devices first establish accidental communication with each other, the accidental communication can be permitted or rejected depending on basic conditions. In the simplest case, these basic conditions include defined geo-coordinates of the mobile and stationary devices, defined and detected field strengths of transmission and reception ranges, defined and measured distances, transmitted broadcasts, logical connections between the mobile and stationary devices stored in the transmitter/receiver units, and sensors for detecting communicating transmitter/receiver units.

To ensure that the data contents of transmitted information signals can be efficiently decoded and processed further, the data contents are structured in an advantageous embodiment of the present invention, whereby the structure essentially involves subdividing the data contents into basic data and specific data.

In an advantageous further development of the present invention, selection criteria for the mobile and stationary devices that communicate with each other are created using the basic data. The basic data can include, for example, participant identification, geographical position data, time windows, driving speeds and driving directions. The specific data, on the other hand, include specific parameters of the particular process and interpretation algorithms that make it possible, in a simple manner, to adapt parameters transferred from one process to the special conditions of another process. The advantage of this is that general data contents can also be adapted to special circumstances.

Due to the fact that targeted communication based on the accidental communication between mobile and stationary devices automatically establishes communication with third parties, it is ensured that those mobile and stationary devices are always incorporated in the communication system that are required to execute certain processes in agricultural applications, such as harvesting, hauling away and storing harvested crops.

Particular advantages of the communication system according to the present invention result when the mobile devices are configured as agricultural working machines and the communication system is used to optimize agricultural process chains.

Due to the fact that accidental communication, at first, and then targeted communication between mobile and stationary devices is permitted only when event-dependent and/or location-dependent relationships exist between the mobile and stationary devices to be incorporated in the communication system, it is ensured that the communication is always event-oriented, thereby preventing an unnecessary exchange of data.

In an advantageous further development of the present invention, the communication, which is based on location-dependent relationships, can be carried out using GPS-based data.

In a first advantageous agricultural application, the communication system can be designed as a drive-support system that transmits planned driving routes, instructions for load-transferring processes between agricultural working machines, and safety-related data to prevent collisions, as needed. The particular advantage of this is the fact that the orientation on the field is simplified considerably for the operator of the agricultural working machine.

In a further advantageous agricultural application, the communication system can be designed as a method data transfer system that includes the authorization and release of users and functionalities for defined working methods and processes, and documentation of process data. When agricultural working machines are used in groups, in particular, this enables communication that is effective and limited to the agricultural working machines that are integrated in the harvesting process.

In a further advantageous agricultural application, the communication system can be designed as an information service system that provides machine and plant-specific parameters and external basic conditions. Due to the fact that the machine-specific parameters can be recommended machine settings, the plant-specific parameters of the properties of harvested crops, and the external basic conditions of ground conditions and climate information, a communication system is created that quickly and effectively enables optimization of the adjustable parameters of the working devices of the agricultural working machines integrated in the communication system.

In an advantageous further development of the communication system according to the present invention, the provision of machine parameters can also include the region-specific provision of machine settings.

A broad application of the communication system according to the present invention can also be obtained when the communication is carried out in an Internet-based manner.

Further advantageous embodiments are the subject of further subclaims and are described below with reference to a plurality of figures of exemplary embodiments that are presented.

DESCRIPTION OF THE PREFERRED EMBODIMENTS

Figure 1:
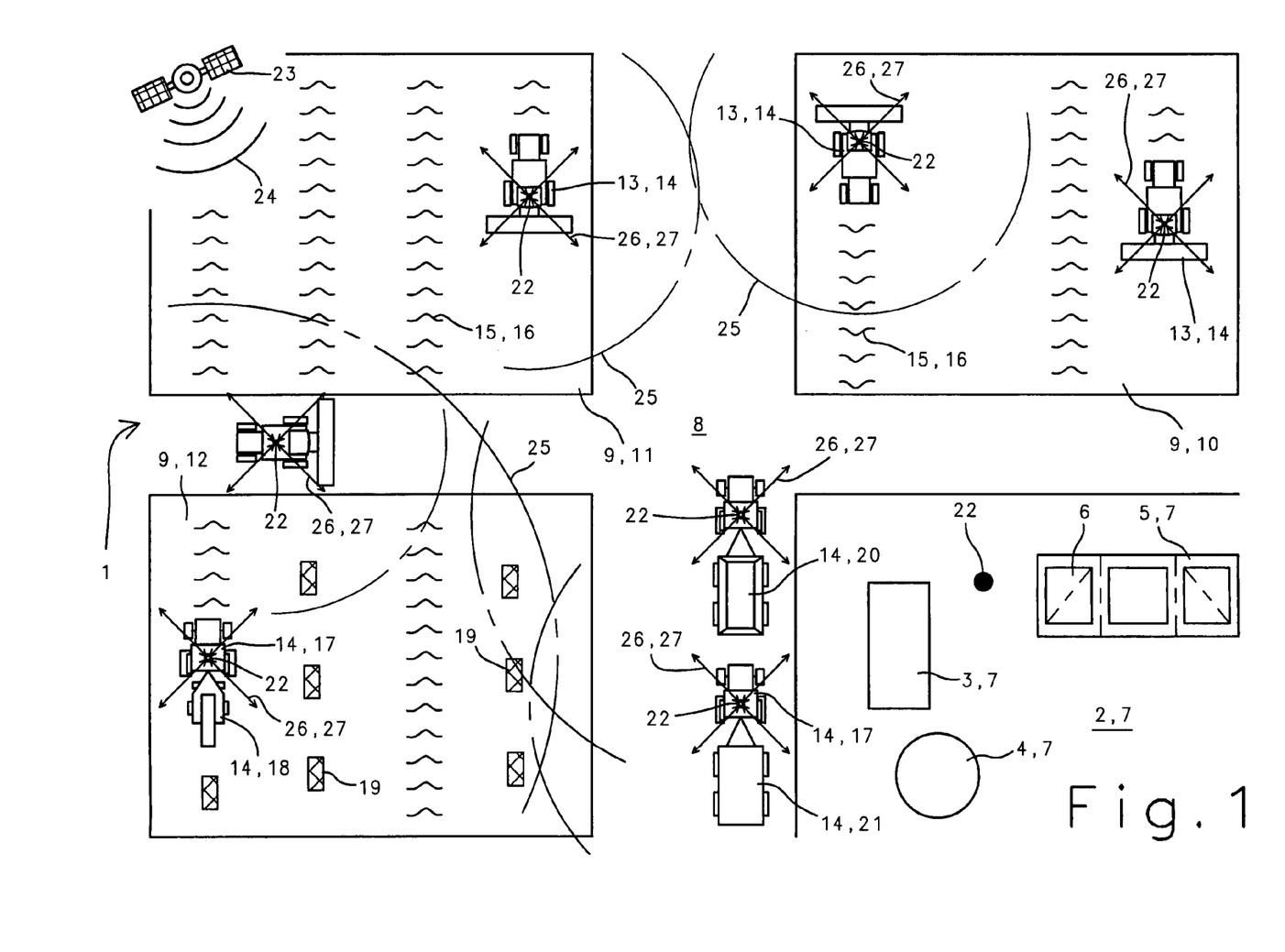
FIG. 1 shows the communication system according to the present invention with reference to an agricultural application.

FIG. 1 shows communication system 1 according to the present invention, for use in an agricultural application. In the lower right-hand corner of FIG. 1, an agricultural operation 2 is shown as a schematic illustration; it includes a grain drying device 3, a grain storage device 4, and a workshop area 5, whereby workshop area 5 is subdivided into individual repair areas 6. Agricultural operation 2 as such, and its structural units of grain drying device 3, grain storage device 4 and workshop area 5 are the stationary devices 7 of communication system 1, according to the present invention, which will be described in greater detail below.

Agricultural operation 2 is connected with a large number of territories 9 to be worked, cultivated fields 10-12 in this case, via a road and path network 8 having any possible configuration. Two agricultural working machines 14 configured as combine harvesters 13 are performing harvesting work on a first cultivated field 10, whereby combine harvesters 13 place the harvested crops—typically grain, in this case—in a storage device, for intermediate storage, in a manner that is known per se and is therefore not shown, while straw 15 produced in the harvesting process is put down as swath on cultivated field 10 in the area behind combine harvester 13. A further agricultural working machine 14 configured as a combine harvester 13 performs harvesting work in a similar manner on a further cultivated field 11. The processing of agricultural working areas 10, 11 shown is therefore a typical application of combine harvesters 13 in harvesting work, since a plurality of fields 10, 11 is usually worked simultaneously—for reasons of economic efficiency—by a fleet of machines composed of a plurality of agricultural machines 14. A further cultivated field 12 is also shown, on which a bale press 18 drawn by a tractor 17 presses the harvested crops put down in swaths 16 into crop bales 19. The combination of tractor 17 and bale press 18 forms a further agricultural working machine 14 that can be incorporated in communication system 1 according to the invention in a manner to be described in greater detail below.

To illustrate communication system 1 according to the present invention, further agricultural working machines 14 moved along road and path network 8 are also shown in FIG. 1. A first agricultural working machine 14 is configured as a combination of a tractor 17 with a fillable hauling trailer 20, the agricultural working machine typically being used to carry the harvested crops placed in intermediate storage in the storage device of combine harvester 13. A further agricultural working machine 14 is configured as a combination of a tractor 17 coupled with a flatbed trailer 21, which is typically used to receive crop bales 19 put down on territory 9 to be worked. In addition, agricultural working machines 14 moved along road and path network 8 can be further combine harvesters 13. It is within the scope of the present invention for agricultural working machines 14, which will be incorporated in communication system 1, to have any possible configuration and to also include, e.g., ground-working devices, fertilizing and sowing units, and highly diverse types of harvesting machinery.

According to the present invention, the mobile devices of communication system 1 configured as agricultural working machines 14, and stationary device 7 configured as agricultural operation 2 have at least one transmitter/receiver unit 22, which can also be structured such that it can receive and process "GPS position signals" 24 generated by satellites 23. Each of these transmitter/receiver units 22 can receive data signals 26 having any possible structure within their transmission and reception range 25 or transmit data signals 27 generated in the particular agricultural working machine 14 or stationary device 7 into the particular transmission and reception range 25. It is within the scope of the present invention for the entire agricultural operation 2 to have a single transmitter/receiver unit 22, or for a separate transmitter/receiver unit 22 to be assigned to each structural unit 3-5.

Figure 2:
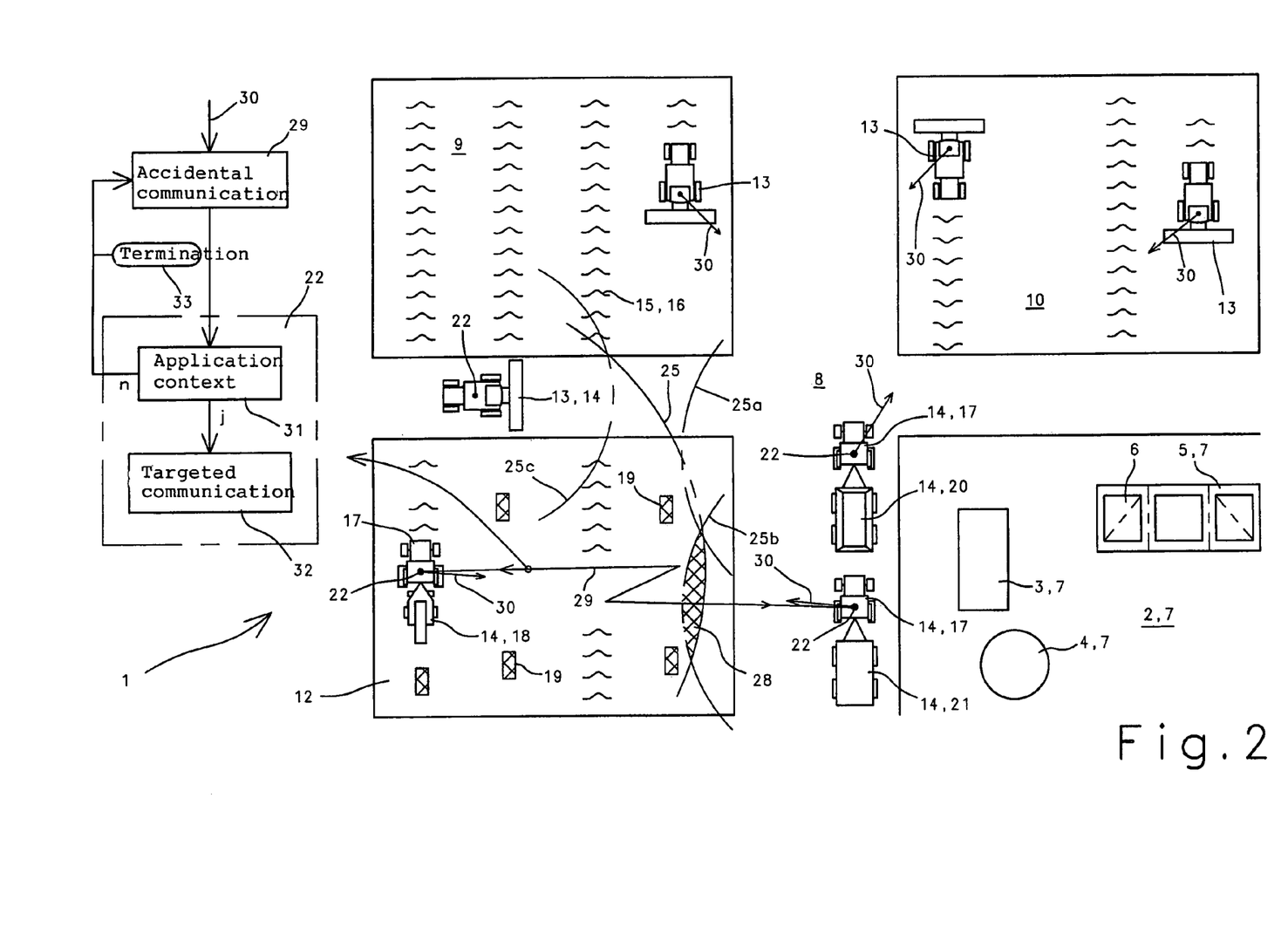
FIG. 2 shows details of the communication system with reference to an agricultural application.

As a result of the movement of agricultural working machines 14, which depends on the driving direction, it is possible—as shown in FIG. 2—that transmission and reception ranges 25 of highly diverse agricultural working machines 14 will overlap each other or transmission and reception ranges 25 of stationary devices 7. Due to the fact that agricultural working machines 14 configured as the combination of tractor 17—hauling trailer 20 and tractor 17—flatbed trailer 21, and agricultural working machine 14 configured as combine harvester 13 move along road and path network 8, transmission and reception ranges 25, 25a-c of highly diverse agricultural working machines 14 overlap at least partially, depending on the position of agricultural working machines 14. Due to overlap area 28 of individual transmission and reception ranges 25, 25a-c formed in this manner, the particular agricultural working machines 14 can communicate with each other. This communication possibility is formed first via accidental communication 29, according to the present invention, between highly diverse mobile devices of communication system 1 configured as agricultural working machines 14. In the exemplary embodiment shown, e.g., all agricultural working machines 14 moving along road and path network 8 enter into this accidental communication 29 with agricultural working machine 14 configured as bale press 18.

Only flatbed trailer 21 on cultivated field 12 described is required to haul away crop bales 19 put down on cultivated field 12 worked by bale press 18, however. Neither hauling trailer 20 shown nor combine harvester 13 are suited for hauling away crop bales 19. In the simplest case, accidental communication 29 can arise by the fact that transmitter/receiver unit 22 of tractor 17 that is drawing bale press 19 generates an information signal that includes, e.g., the request for a flatbed trailer 21 and the geo-referenced transmission of data regarding the position of crop bales 19 put down on field 21. In the simplest case, agricultural working machines 14 that receive this information signal 30 would then run a check in transmitter/receiver unit 22 to determine whether information signal 30 that was received is relevant for particular agricultural working machine 14. This could take place, for example, by running a check for an application context 31 in transmitter/receiver unit 22 that is receiving information signals 30. If an application context 31 does exist, the accidental communication changes to targeted communication 32.

In the exemplary embodiment shown in FIG. 2, this application context 31 exists only between bale press 18 and tractor 17 with flatbed trailer 21, so that accidental communication 29 changes to targeted communication 32 only between these two, in the manner according to the present invention. For remaining agricultural working machines 14 moving along road and path network 8 shown in FIG. 2, the communication retains the status of an accidental communication 29 or results in termination 33 of communication. The operator of tractor 17 that is drawing flatbed trailer 21 receives, via information signals 30, information that is relevant to him, this information resulting in his steering flatbed trailer 21 onto corresponding field 12 to load crop bales 19. In an advantageous further development of the present invention, transmitted information signals 30 can also transmit an optimized driving route to tractor 17 described above to pick up crop bales 19. Due to the fact that the operator of the tractor steers said tractor onto field 12 in question and may work the proposed driving route, received information signal 30 also results in a concrete reaction of agricultural working machine 14 to received information signals 30.

A further application of communication system 1 according to the present invention results, e.g., when tractor 17 that is pulling hauling trailer 20 is to be used as an "unloading vehicle" for agricultural working machines 14 designed as combine harvester 13. This unloading process is essentially determined according to when and where which combine harvester 13 must be unloaded, or in which order and when filled combine harvesters 13 are permitted to control unloading vehicle 17, 20, so that they do not get in each other's way during the load-transferring process. In this case, targeted communication 32 takes place between tractor 17 that is pulling hauling trailer 20 and combine harvesters 13 used on particular fields 10, 11, whereby it is within the scope of the present invention for tractor 17 and combine harvesters 13 to generate information signals 30 that change accidental communication 29 into targeted communication 32.

A further, frequently occurring application relates to targeted communication 32 of combine harvesters 13 with each other. For example, combine harvester 13 moved on road and path network 8 could be provided to support combine harvesters 13 already in use. Information signals 30 generated by combine harvesters 13 in use could include, e.g., information for setting the parameters of the working devices of new combine harvester 13 to be used, the parameters then being set on this combine harvester 13 either automatically or by the operator, so that new combine harvester 13 to be used starts the harvesting process with optimized parameter settings already in place. Due to the fact that further combine harvester 13 directly and automatically accepts the already-optimized parameter settings transferred to it, it reacts in an initial manner according to the present invention.

It is also feasible, however, for further combine harvester 13 to further process the parameter setting transferred to it in a manner appropriate for the situation, in a second manner according to the present invention. Based on the example shown, this could mean that the further combine harvester accepts only those transferred parameters that are also capable of being set in further combine harvester 13, or that the transferred parameters are converted depending on the special type of combine harvester 13. For example, the rotational speeds of the highly diverse working devices of a combine harvester 13 vary between the models of combine harvesters from various manufacturers, and in some cases considerably, despite the fact that the properties of the harvested crops are identical. Due to the fact that the transmitter/receiver unit 22 of further combine harvester 13 to be used takes only the parameters of the harvested crops into account and, from these, determines the optimal parameter settings for the working devices for further combine harvester 13, communication system 1 according to the present invention also achieves a high degree of flexibility in terms of agricultural working machines 14 to be incorporated in communication system 1.

It is within the scope of the present invention for initially accidental communication 29 and the communication that changes to targeted communication 32 depending on application context 31 to also take place between agricultural working machines 14 and stationary devices 7. For example, when loading trailer vehicles 20, 21 leave particular fields 10-12, they can first enter into accidental communication 29 with stationary device 7 or directly with its structural units 3-6. Transmitter/receiver unit 22 of tractor 17 that is pulling hauling trailer 20 can communicate, e.g., the moisture content of the transported crops via information signal 30 generated by it to stationary device 7, so that stationary device 7 pilots stated tractor 17 via a targeted communication 32 either to a grain drying device 3 or immediately to a grain storage device 4 to place the grain in intermediate storage.

It is furthermore also feasible, however, that any agricultural working machines 14 can enter into a targeted communication 32 with a stationary device 7 designed as a workshop 5 via an accidental communication 29, the targeted communication ultimately resulting in information signals 30 from agricultural working machine 14 informing workshop 5 about the damage to be eliminated and vice versa, and information signals 30 from stationary device 7 result in particular agricultural working machine 14 being directed into a certain repair area 6 of the workshop. The particular advantage of this is that, while agricultural working machine 14 is driving to repair area 6, said repair area can already be prepared in a targeted manner such that, when agricultural working machine 14 arrives, the components and tools required for the repair work have been gathered, so that the repair work can start as soon as agricultural working machine 14 arrives. This reduces some of the unproductive and expensive repair times considerably.

Figure 3:
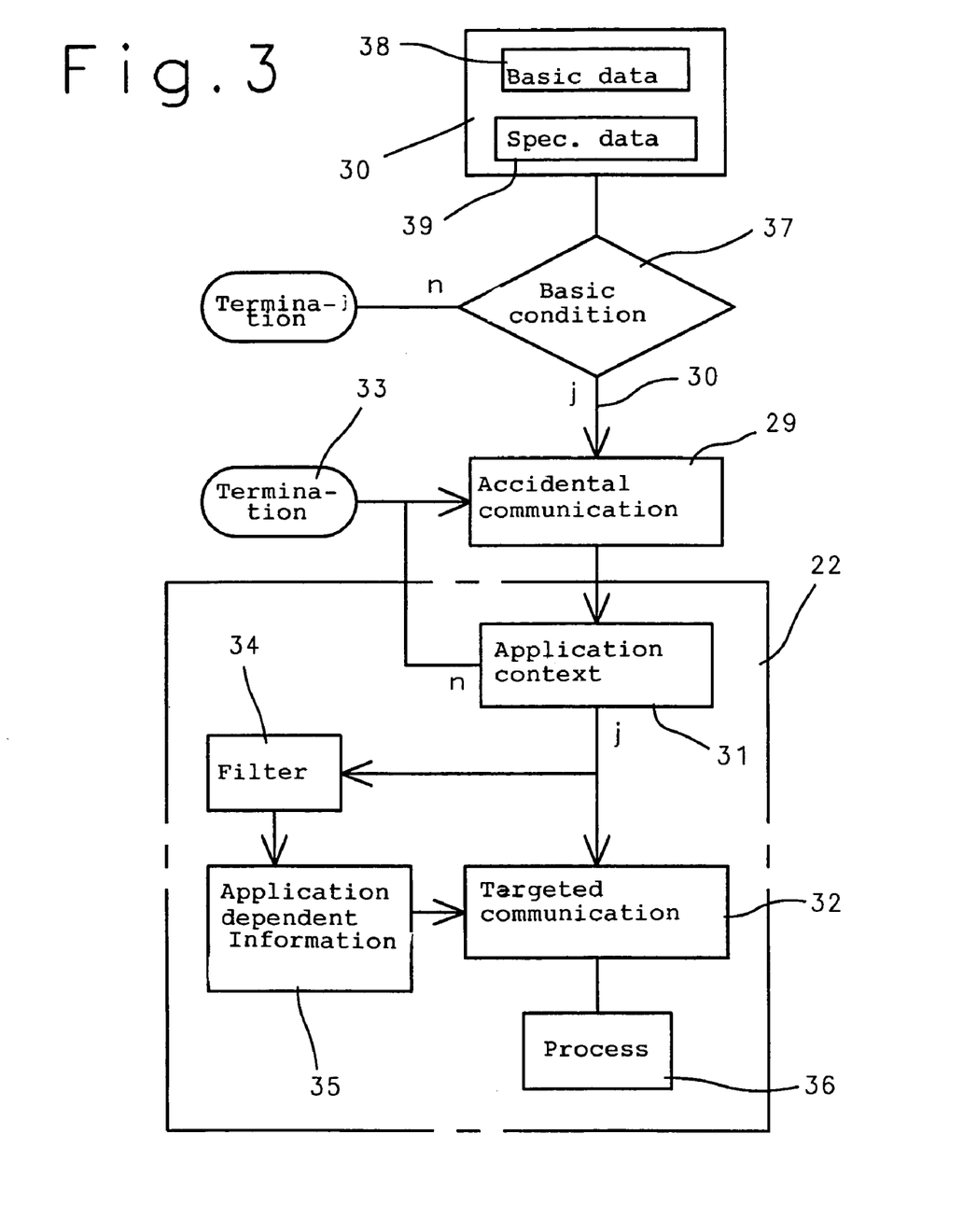
FIG. 3 shows a schematic flow chart of the communication system according to the present invention.

Due to the fact that transmitter/receiver units 22 first determine an application context 31 between accidentally communicating agricultural working machines 14, particular transmitter/receiver units 22 are also structured such that they can prefilter the large number of information encoded in their information signals 30 using a software filter 34, as shown in FIG. 3, so that targeted communication 32 and the associated execution of processes 36 take place only based on application-dependent information 35. In addition to processes 36 described previously, a large number of processes are feasible here in the agricultural application. For example, process 36, which depends on targeted communication 32, can include generating and executing driving instructions, generating warning messages, creating instructions for completing an order, updating order information and executing an automatic recording of process data.

In addition to application context 31 described above, which basically involves checking a factual relationship between communicating agricultural working machines 14 and/or stationary devices 7, once an accidental communication 29 has started, the acceptance of accidental communication 29 can be linked to basic conditions 37 such that accidental communication 29 is accepted only when these basic conditions 37 are met. These basic conditions 37 to be met can be, e.g., the detection of a defined minimum field strength of information signals 30 received by transmitter/receiver units 22, thereby ensuring data transfer that functions in a stable manner. To ensure that the communication activities between the agricultural working machines 14 and/or the stationary devices are also kept at the necessary level and not the possible level, basic conditions 37 to be met can also include defined distances and geo-coordinates that ensure that initially accidential communication 29 is permitted only when units communicating with each other 7, 14 are located in these narrowly defined territorial areas.

From the same perspective, basic condition 37 to be fulfilled can be the transmission of a "broadcast" that specifically addresses selected agricultural working machines 14 and/or stationary devices 7, so that accidental communication 29 takes place only between them. Analogous to application context 31 described above, basic conditions 37 according to the present invention can also be logics stored in transmitter/receiver units 22 that define a context between agricultural working machines 14 and stationary devices 7. It is also feasible that basic conditions 37 include only the detection of mobile or stationary devices (7, 14) using suitable sensors without the need for any other special conditions to be fulfilled.

In the simplest case, agricultural working machines 14 that receive this information signal 30 would then run a check in transmitter/receiver unit 22 to determine whether received information signal 30 is relevant for particular agricultural working machine 14, whereby this query can be realized in particular using logics stored in particular transmitter/receiver units 22. This could take place in a manner, for example, such that an application context 31 is checked in transmitter/receiver unit 22 that receives information signals 30. If an application context 31 of this nature does exist, the accidental communication changes to a targeted communication 32.

To ensure that information signals 30 are capable of being efficiently processed further in particular transmitter/receiver unit 22 by employing simple signal processing algorithms, information signals 30 transfer the structured data contents in a manner such that information signals 30 are composed of basic data contents 38 and specific data contents 39. Basic data 38, which will be checked first by particular transmitter/receiver unit 22, essentially includes basic conditions 37 described previously and information about application context 31. With regard for application context 31 in particular, basic data 38 can include, in the simplest case, participant identification, i.e., "IDs".

Furthermore, the communication between grain storage device 4 and a hauling trailer 20 which is currently being unloaded can be terminated when hauling trailer 20 leaves grain storage unit 4 and unloaded hauling trailer 20 moves away from grain storage unit 4. It can be encoded in information signals 30 such that it includes information on the driving direction and/or distance that ultimately results in termination of the communication or does not permit it at all. In terms of logistics, these basic data 38 can also include information on the driving speed of hauling vehicles, their current position and "time windows", so that hauling vehicles enter into an accidental communication with a control point to execute, e.g., a forwarding order, only when hauling vehicle meets basic conditions 37 defined in basic data 38.

Based on the agricultural application, specific data 39 typically include the transfer of machine-specific adjustment parameters, parameters specific to harvested crops, and external basic conditions such as temperature, ambient humidity and geographical details. As described above, specific data 39 also include the interpretation of received information signals 30, namely in the simplest case when the transmitted adjustment parameters of an agricultural working machine 14 must be transformed to the conditions of a different type of agricultural working machine 14.

In addition, communication system 1 according to the present invention is configured such that agricultural working machines 14 and/or stationary devices 7 can communicate with each other using any types of data exchange systems. This could be an Internet-based communication 29, 32, for example, now that this type of communication has become widespread.

Due to the fact that accidental communication 29 can be coupled to the fulfillment of certain basic conditions 37 and targeted communication 32 is introduced only when an application context 31 exists, the communication between agricultural working machines 14 and/or stationary devices 7 can be controlled in an event-dependent and/or location-dependent manner, whereby the location-dependent control can take place in a GPS-based manner.

In a further embodiment of the present invention, communication system 1 can also be structured such that targeted communication 32 based on initially accidental communication 29 includes the automatic incorporation of further agricultural working machines 14 and/or stationary devices 7 in communication system 1. An application would be one in which, for example, a grain-drying device 3 automatically incorporates further grain-drying devices 3 in communication system 1 depending on the extent of their utilization, so that hauling vehicles 17, 20 receive information 30 in a timely manner as to when another grain-drying device 3 should be driven to.

Figure 4:
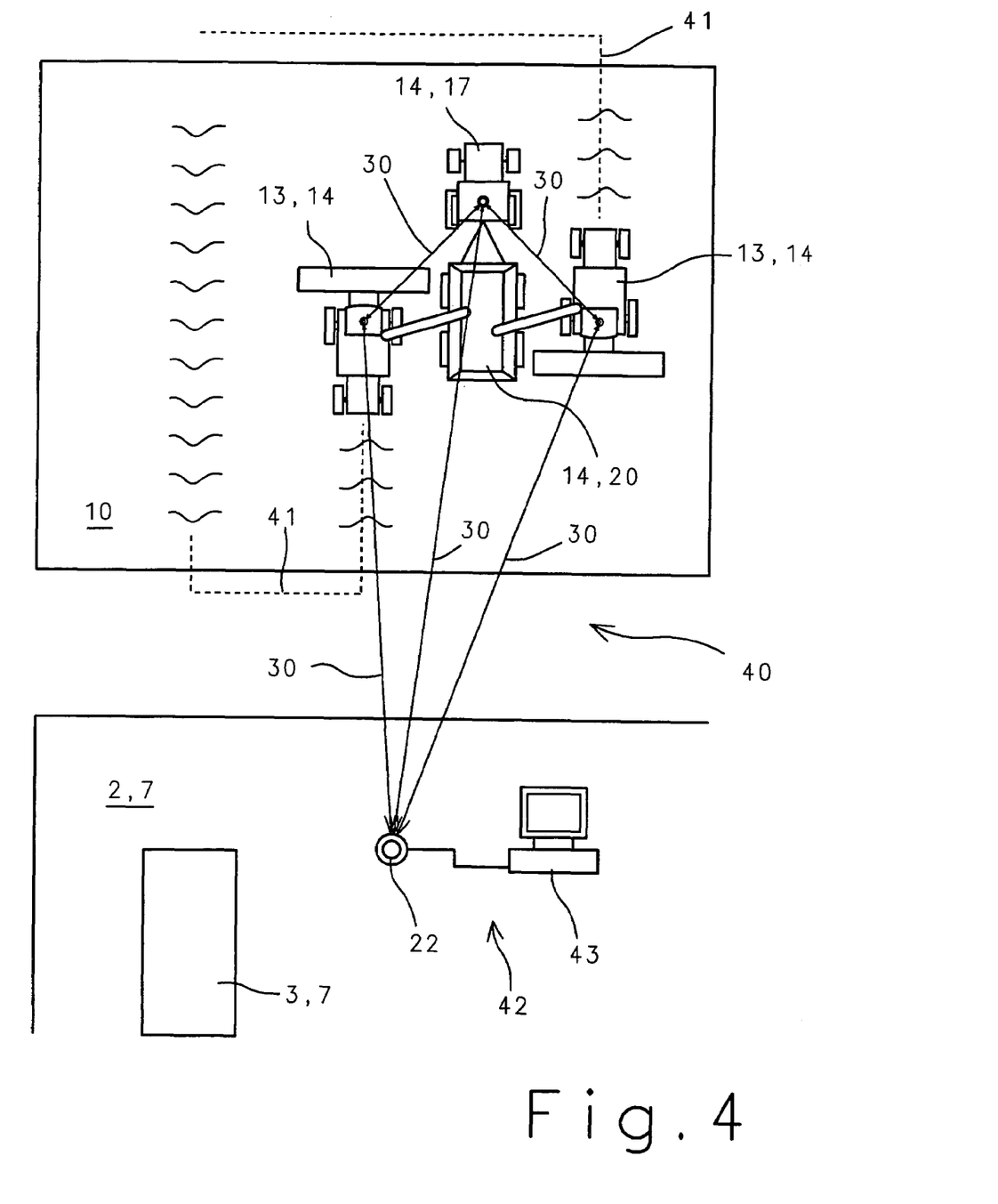
FIG. 4 shows a further agricultural application of the communication system according to the present invention.

According to FIG. 4, targeted communication 32 can be a "drive-support system" 40 that coordinates the harvesting drives of combine harvesters 13 on field 10 and the drives during the unloading procedure on hauling trailer 20. Drive-support system 40 can generate driving routes 41, coordinated with each other, of agricultural working machines 14, and instructions to the operators of agricultural working machines 14, in particular safety instructions for avoiding collisions between agricultural working machines 14.

Furthermore, targeted communication 32 can be a method data transfer system 42 in which information signals 30 include process data on the harvesting process, which can be stored, e.g., in a central arithmetic unit 43, in a manner such that they can be called up. A method data transfer system 42 of this type simplifies performance calculations, for example, such as the calculation—as a function of yield, output per unit surface area, and usage time—of harvesting work performed by leased combine harvesters 13.

As described above, targeted communication 32 can also be configured as an information service system that, in the simplest case, exchanges machine and crop-specific parameters and external basic conditions between agricultural working machines 14. The machine-specific parameters include recommended settings for the working devices of agricultural working machines 14, while the plant-specific parameters are essentially related to properties of harvested crops, and the external basic conditions are based on ground states and climate information. In this context, it is also feasible that the recommended settings provided are generated on a region-specific basis.

Figure 5:
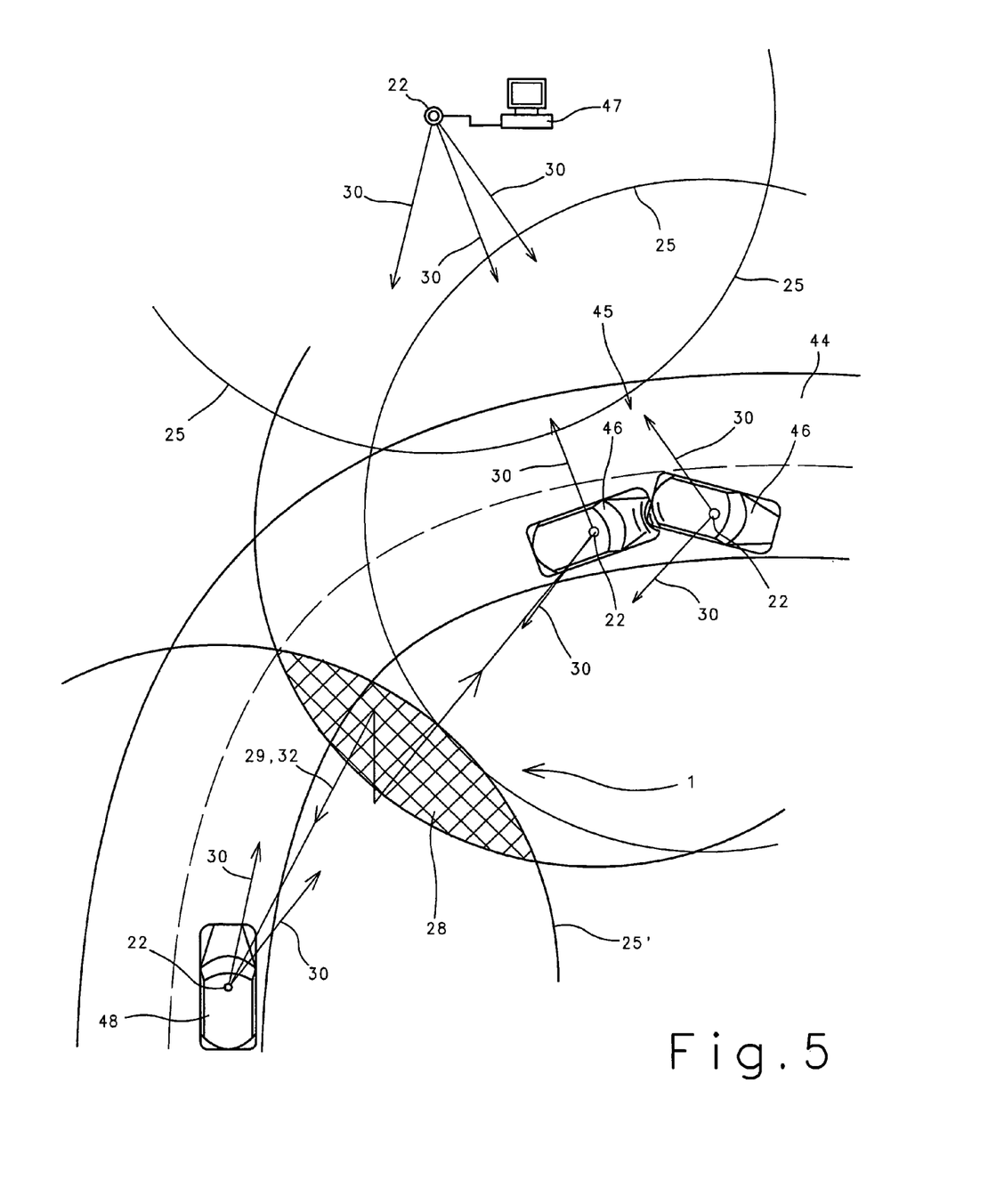
FIG. 5 shows a non-agricultural application of the communication system according to the present invention.

As an example, FIG. 5 shows an application of communication system 1 according to the present invention that is not the agricultural application. An accident 45 has taken place between two motor vehicles 46 on a street 44. Transmitter/receiver units 22 of motor vehicles 46, which are the mobile devices of communication system 1, or a stationary device 7 configured as a central accidental control point 47, transmit the geographical position data about the accident site—as information signals 30 according to the present invention, for example—within particular transmission and reception area 25. A further motor vehicle 48 that is driving on same street 44 in the direction of accident 45 receives—via its transmitter/receiver unit 22—information signals 30 related to accident 45 within its transmission and reception area 25' in an overlapping area 28.

According to the present invention, initially accidental communication 29 is transformed by particular transmitter/receiver units 22 into a targeted communication 32. In the simplest case, the driver of motor vehicle 48 moving in the direction of accident 45 would automatically receive a warning, so he can reduce his driving speed and stop if necessary. It is within the scope of the invention that the receipt of accident-related information triggers automatic braking of subsequent vehicle 48 without the driver being involved in this procedure. The particular advantage of this is that the accident-related information can also be reacted to very quickly and independently of the reaction time of the driver, due to the very high driving speed in some cases.

One skilled in the art is capable of transforming communication system 1 described in a manner not shown or to use it in applications other than those shown here to obtain the effects described, without leaving the scope of the invention.

It will be understood that each of the elements described above, or two or more together, may also find a useful application in other types of system and method differing from the types described above.

While the invention has been illustrated and described as embodied in a communication system and method for mobile and stationary devices, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claim is:

1. A communication system for mobile and stationary devices, which act as receivers and sources of information, respectively, comprising at least one transmitter/receiver unit provided for the mobile and stationary devices and having a defined transmission/reception range, and also formed so that at least partial overlap of the transmission/reception ranges of the mobile and/or stationary devices results in accidental communication between the mobile and/or stationary devices, and this accidental communication changes to a targeted communication, wherein communication comprises a direct exchange of information between the sources and receivers and the communication system is formed so that during the accidental communication, an application context between the communicating mobile and/or stationary devices is credit and, if an application context of this type is not present, the accidental communication is terminated.

2. A communication system as defined in claim 1, wherein the communication system is formed so that the targeted communication involves, at least, an offering relevant information and reacting to this relevant information.

3. A communication system as defined in claim 2, wherein the communication system is formed so that the relevant information is provided in an application-dependent manner.

4. A communication system as defined in claim 3, wherein the communication system is formed so that the application-dependent information triggers an execution of processes.

5. A communication system as defined in claim 4, wherein the system communication is formed so that the processes are processes selected from the group consisting of generation and execution of driving instructions, generation of warning messages, instructions for completing an order, updating order information, and automatic recording of process data.

6. A communication system as defined in claim 1, wherein reacting to the relevant information includes an automatic use of the relevant information and/or its further processing in a manner appropriate for a situation.

7. A communication system as defined in claim 1, wherein the communication system is formed so that the communications can take place between various data exchange systems.

8. A communication system as defined in claim 1, wherein the system communication is formed so that the accidental communication is permitted or rejected depending on basic conditions.

9. A communication system as defined in claim 8, wherein the system communication is formed so that the basic conditions are conditions selected from the group consisting of geo-coordinates, defined and detected field strengths of transmission/reception ranges, defined and measured distances, transmitted broadcasts, logical relationships between the mobile and stationary devices stored in the transmitter/receiver units, and sensors for detecting communicating transmitter/receiver units.

10. A communication system as defined in claim 1, wherein the system communication is formed so that the information signals of the communication are structured.

11. A communication system as defined in claim 10, wherein the system communication is formed so that the information signals include basic data and specific data.

12. A communication system as defined in claim 11, wherein the system communication is formed so that the basic data includes data selected from the group consisting of participant identification, geographic position data, time windows, driving speeds and driving directions.

13. A communication system as defined in claim 11, wherein the system communication is formed so that the specific data includes transmission of parameters and interpretation of parameters.

14. A communication system as defined in claim 1, wherein the system communication is formed so that the targeted communication between the mobile and/or stationary devices based on the accidental communication is formed so as to automatically establish communication with third parties.

15. A communication system as defined in claim 1, wherein the mobile devices are designed as agricultural working machines.

16. A communication method for mobile and stationary devices that act as respective receivers and sources of information, comprising the steps of providing at least one transmitter/receiver unit provided for the mobile and stationary devices and having a defined transmission/reception range; at least partial overlapping the transmission/reception ranges of the mobile and/or stationary devices, resulting in accidental communication between the mobile and/or stationary devices; and changing this accidental communication to a targeted communication, wherein communication comprises a direct exchange of information between the sources and receivers and further comprising inquirying, during the accidental communication, an application context between the communicating mobile and/or stationary devices; and, if an application context of this type is not present, terminating the accidental communication.

17. A communication method as defined in claim 16; and further comprising involving in the targeted communication, at least, an offering relevant information, and reacting to this relevant information.

18. A communication method as defined in claim 17; and further comprising triggering by the relevant information in an application-dependent manner.

19. A communication method as defined in claim 18; and further comprising triggering by the application-dependent information triggers an execution of processes.

20. A communication method as defined in claim 18; and further comprising selecting the processes from the group consisting of generation and execution of driving instructions, generation of warning messages, instructions for completing an order, updating order information, and automatic recording of process data.

21. A communication method as defined in claim 16; and further comprising including in the reacting to the relevant information, an automatic use of the relevant information and/or its further processing in a manner appropriate for a situation.

22. A communication method as defined in claim 16; and further comprising providing the communications between various data exchange methods.

23. A communication method as defined in claim 16; and further comprising permitting or rejecting the accidental communication depending on basic conditions.

24. A communication method as defined in claim 23; and further comprising selecting the basic conditions from the group consisting of geo-coordinates, defined and detected field strengths of transmission/reception ranges, defined and measured distances, transmitted broadcasts, logical relationships between the mobile and stationary devices stored in the transmitter/receiver units, and sensors for detecting communicating transmitter/receiver units.

25. A communication method as defined in claim 16; and further comprising structuring information signals of each of the communication.

26. A communication method as defined in claim 25; and further comprising including in the information signals, basic data and specific data.

27. A communication method as defined in claim 26; and further comprising selecting the basic data selected from the group consisting of participant identification, geographic position data, time windows, driving speeds and driving directions.

28. A communication method as defined in claim 27; and further comprising including in the specific data, transmission of parameters and interpretation of parameters.

29. A communication method as defined in claim 16; and further comprising forming the targeted communication between the mobile and/or stationary devices based on the accidental communication so as to automatically establish communication with third parties.

30. A communication method as defined in claim 16; and further comprising designing the mobile devices as agricultural working machines.

\* \* \* \* \*